United States Patent [19]  
Houston

[11] Patent Number: 5,000,422  
[45] Date of Patent: Mar. 19, 1991

[54] INCINERATOR VALVE

[75] Inventor: Reagan Houston, Hendersonville, N.C.

[73] Assignee: Salem Industries, Inc., South Lyon, Mich.

[21] Appl. No.: 545,545

[22] Filed: Jun. 29, 1990

[51] Int. Cl.⁵ ............................................. F16K 1/226
[52] U.S. Cl. .................................. 251/306; 137/246.22
[58] Field of Search ............... 251/305, 306; 137/246, 137/246.22

[56] References Cited  
U.S. PATENT DOCUMENTS 2,392,922  1/1946  Hopkins ............... 137/246.22 X  
4,077,432  3/1978  Herr ........................ 251/306 X  
4,335,738  6/1982  Nassir ................... 137/246.22

Primary Examiner—John C. Fox  
Attorney, Agent, or Firm—Lyon & Delevie

[57] ABSTRACT

A valve comprising a circular butterfly that is rotatable about an axis extending diametrically of a cylindrical valve housing. The butterfly has two axially spaced seal surfaces on the periphery thereof that, in conjunction with complementary axially spaced seats on the valve housing, control the flow of air to or from an annular plenum that surrounds the valve housing.

2 Claims, 3 Drawing Sheets

INCINERATOR VALVE

BACKGROUND OF THE INVENTION

This invention relates generally to incinerator systems for the abatement of process emissions and more specifically, to a novel valve for the control of fluid flow to and from a regenerative incinerator.

Process emissions often contain combustible contaminants that, if released to atmosphere, have the potential of polluting the environment. Incinerators increase the temperature of such process emissions to a temperature above the ignition temperature of the contaminants therein so as to oxidize the contaminants.

One problem that materially effects the efficiency of such incinerators is leakage of contaminated emissions past the relatively large flow control valves required for control of fluid flow to and from the incinerators. The flow control valves in the open mode of operation direct the emissions into one or more regenerators thence to high temperature combustion chambers. Concomitantly, other flow control valves in the closed mode of operation block the flow of contaminated emissions to regenerators that are vented to atmosphere or are being purged of contaminants. Leakage past the flow control valves operating in the latter mode seriously comprises the efficiency of the incinerator system.

SUMMARY OF THE INVENTION

The present invention solves the aforesaid problem of leakage at individual flow control valves by a novel leakage control system that either conducts emission leakage back to the incinerator for oxidation or provides a pressure differential that precludes leakage of emissions past the valve.

The valve consists of a circular butterfly that is rotatable about an axis extending diametrically of a cylindrical valve housing. The butterfly has two axially spaced seal surfaces on the periphery thereof that, in conjunction with complementary axially spaced seats on the valve housing, control the flow of air to or from an annular plenum that surrounds the valve housing.

DETAILED DESCRIPTION OF THE PREFERRED EMBODIMENT OF THE INVENTION

Figure 1:
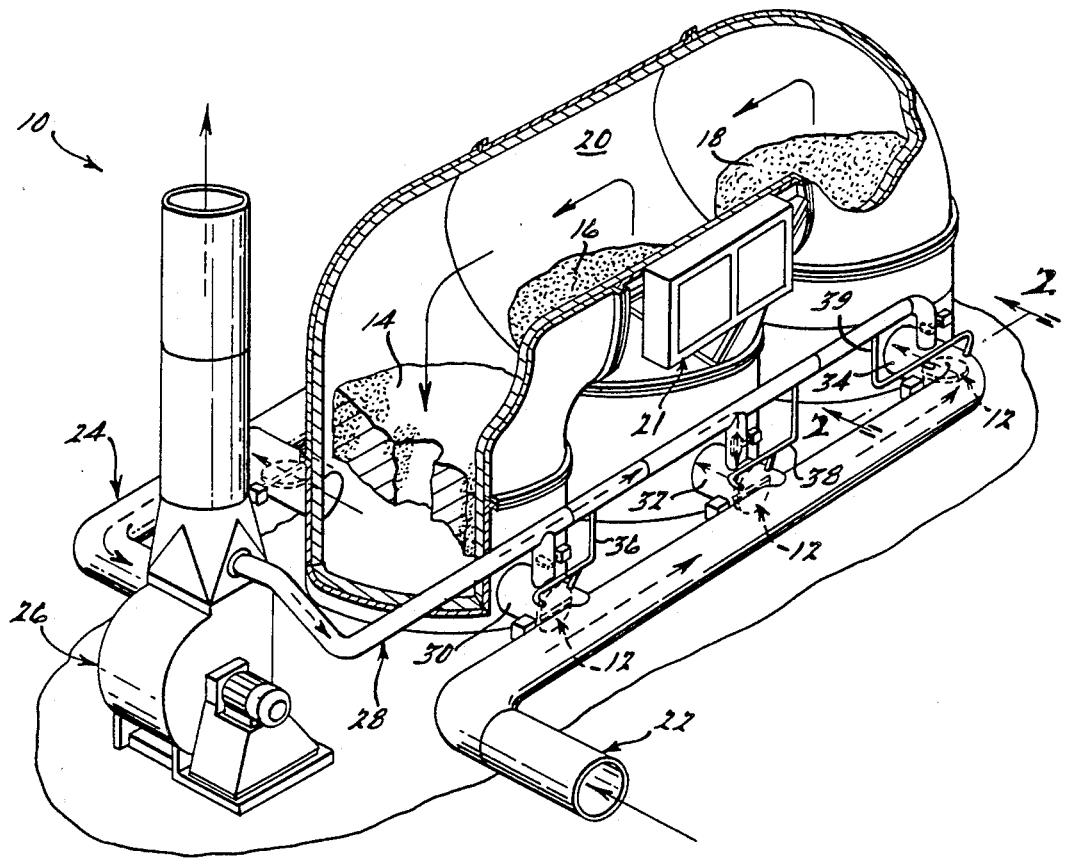
FIG. 1 is a perspective view, partially in section, of a regenerative incinerator utilizing the improved valve of the instant invention.
Figure 2:
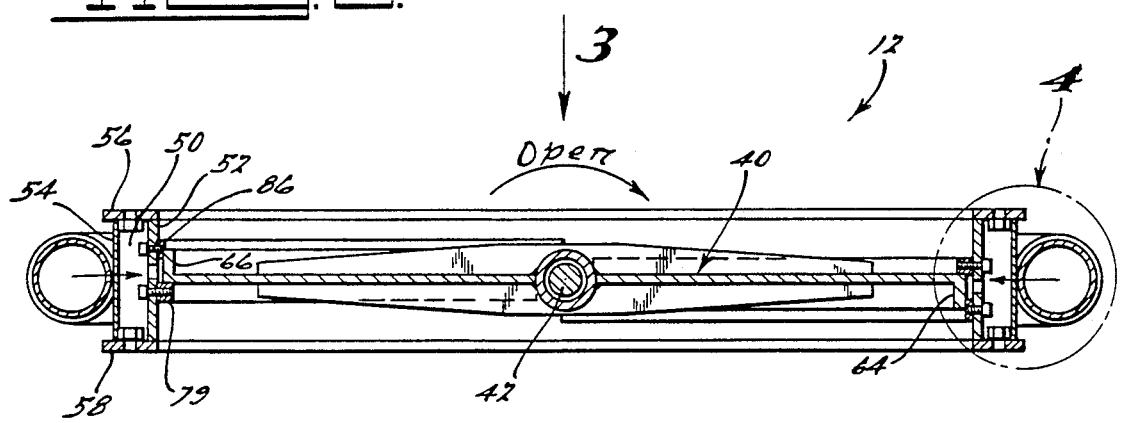
FIG. 2 is a cross-sectional view taken substantially along the line 2—2 of FIG. 1.
Figure 3:
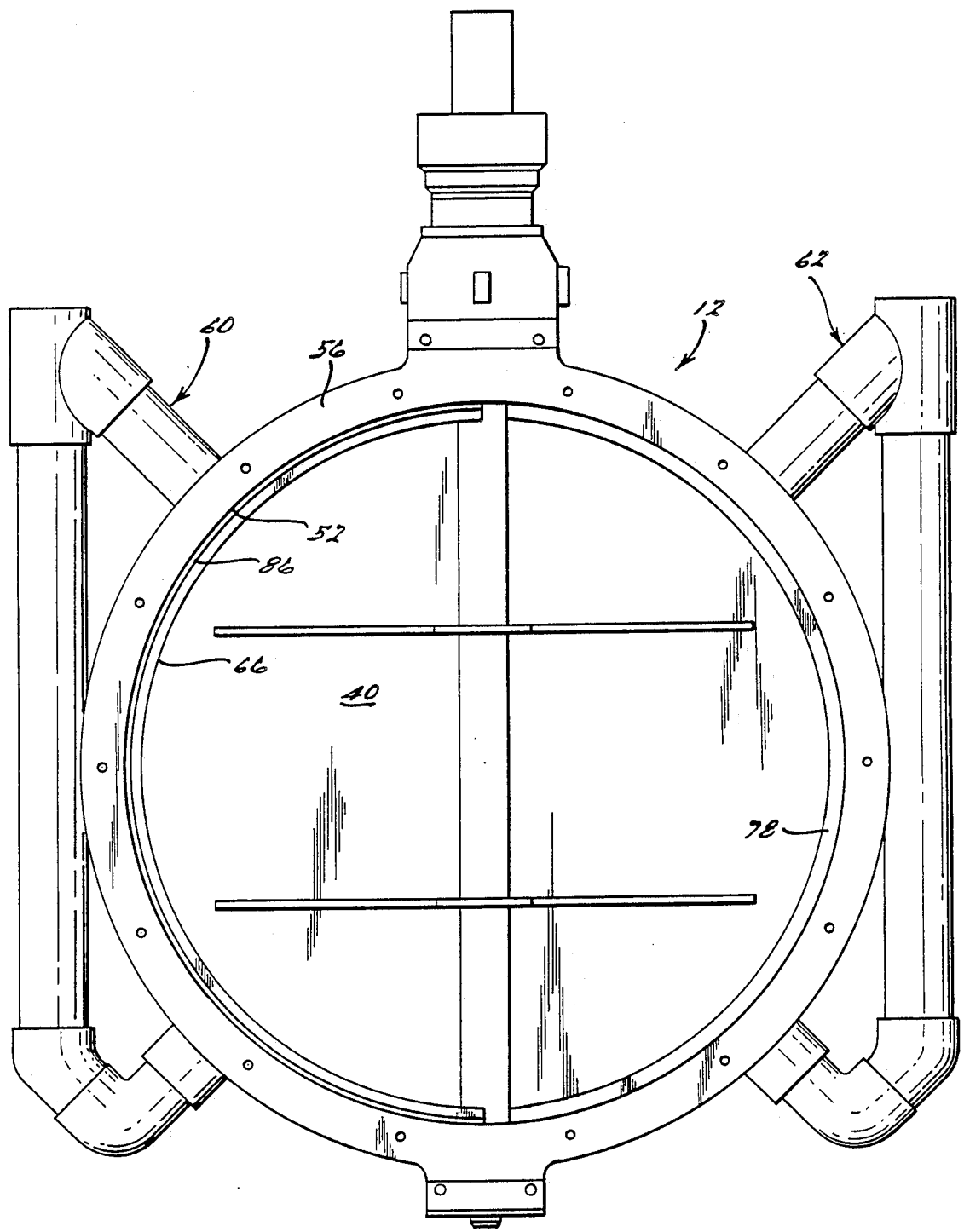
FIG. 3 is a view taken in the direction of the arrow 3 of FIG. 2.

As seen in FIG. 1 of the drawings, a regenerative incinerator 10 comprises the environment wherein the instant invention has particular utility. The incinerator 10 utilizes a plurality of valves 12 to control the flow of contaminated emissions and cleansed air to and from the incinerator 10, respectively.

The incinerator 10 comprises a plurality of conventional regenerator beds 14, 16 and 18 that communicate with a combustion chamber 20. Fuel, for example natural gas, is supplied to the combustion chamber 20 from a fuel control and burner 21. Contaminated fluids at a pressure below atmospheric are conducted to the incinerator 10 by a duct 22 from a source (not shown). Cleansed air is conducted away from the incinerator 10 by a duct 24 that is in fluid communication relationship with an exhaust blower 26. Exhaust air is vented to atmosphere or conducted through a conduit 28 to ducts 30, 32 and 34 to purge the regenerator beds 14, 16 or 18, selectively, or to ducts 36, 38 or 39 to pressurize the valves 12, as will be described. After passing the selectively opened valves 12, the contaminated fluids are ducted to the regenerative beds 14, 16 and 18 by ducts 30, 32 and 34, respectively.

In accordance with the present invention, each valve 12 comprises a circular disk or butterfly 40 that is mounted for rotation on a shaft 42. The shaft 42 may be rotated by an electric, hydraulic or pneumatic actuator, as desired. An annular valve plenum 50 defined by a valve housing 52, an outer wall 54, and annular end rings 56 and 58, surrounds the housing 52 and is radially aligned with the butterfly 40 when it is in the closed condition.

Fluids are conducted to and from the plenum 50, as desired, by a pair of manifolds 60 and 62 that are mounted externally of the valve housing 52 and communicate, in the illustrated mode of operation, with the purified air duct 28 and the purified exhaust blower 26.

In accordance with a feature of the present invention, the butterfly 40 is provided with a pair of peripheral flanges 64 and 66 on opposite sides of the shaft 42 that extend concentrically with the cylindrical valve housing 50 in the direction of rotation of the butterfly 40.

Figure 4:
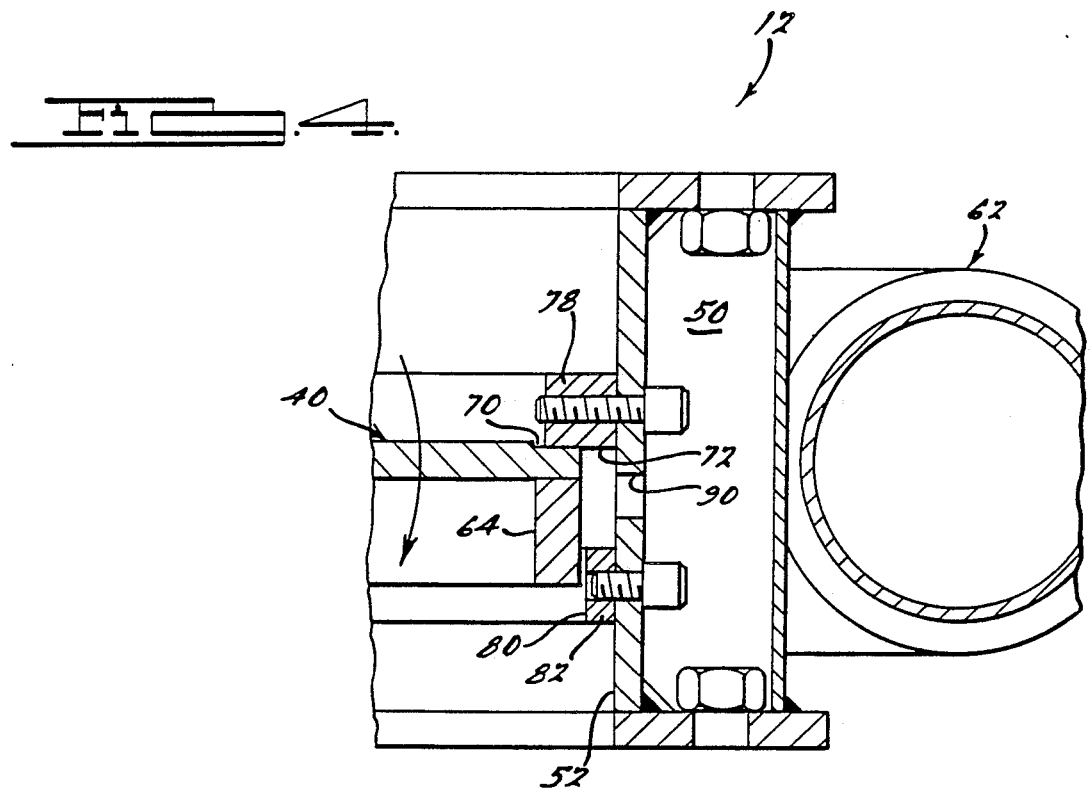
FIG. 4 is an enlarged view of the subject matter within the circle 4 of FIG. 2.
Figure 5:
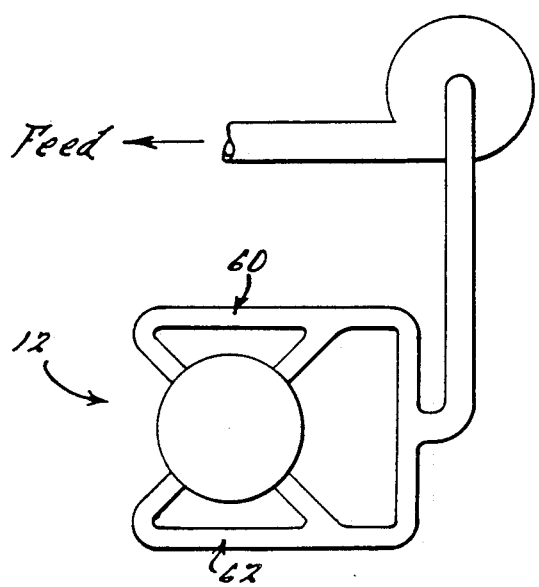
FIG. 5 shows an alternative configuration of the valve of the instant invention.

As best seen in FIG. 4, the butterfly 40 is also provided with a radially extending axially facing seating surface 70 on the periphery thereof which seats against a complementary surface 72 on a semi-circular valve seat or housing flange 78 on the valve housing 52. A similar semi-circular valve seat or housing flange 79 is provided on the opposite side of the valve housing 52. It is to be noted that the valve seat 72 extends at a right angle to the central axis of the cylindrical valve housing 52 so as to accommodate radial expansion and contraction of the valve housing 52.

A second valve surface 80 is defined by an annular housing flange 82 that is secured to the inner periphery of the valve housing 52. The surface 80 on the flange 82 is spaced from the outside diameter of the flange 66 by, for example, .020 inch to provide for the aforesaid radial expansion and contraction of the expansion and contraction of the valve housing 52. The clearance between flange 66 and flange 80 is determined by the relative thermal expansion between the butterfly 40 and the valve housing 52. For example, for a steel valve of 24 inches diameter where the butterfly 40 might be 100° F. warmer than the valve housing for a short time, a clearance of 0.020 inches is satisfactory. This represents a clearance of about 0.08% of the valve diameter. A smaller clearance such as 0.05% is satisfactory where smaller temperature differences are expected. A similar valve surface 84 is defined by a housing flange 86 on the opposite side of the butterfly 40 which, in cooperation with the flange 66 on the butterfly 40, provides for radial expansion of the butterfly 40.

In operation, emissions enter the incinerator 10 through the duct 22. As seen in FIG. 1, two of the valves 12 are in the closed mode while the third valve 12 is open. Contaminated emissions pass through the open valve 12, thence through the conduit 34, thence upwardly through the regenerator bed 18 to pick up heat therefrom, thence to the combustion chamber 20. After oxidation of the contaminants in the combustion chamber 20, the cleansed air passes downwardly through the regenerator bed 14, which is operating in the regenerative or heat receptive mode, thence outwardly through an open outlet valve 12 to the exhaust duct 24. The blower 26 creates a relatively low pressure in the duct 24 to induce flow of cleansed air from the incinerator 10 for discharge to atmosphere or to the purified air duct 28. Purified air flowing under pressure through the duct 28 is conducted to the regenerative bed 16 to purge the bed of contaminants in the conventional manner.

In accordance with the present invention, air under pressure higher than the feed gas is directed through the ducts 36, 38 or 39 to the manifolds 60 and 62 of the valves 12. As best seen in FIG. 4, pressurized air in the manifold 62 is conducted to the plenum 50 thence through the aperture 90 in the valve housing 52 to the space defined by the housing flanges 78 and 82 and butterfly flange 64. The valve surface 70 is seated against the valve seat 72 on the housing flange 78 thereby minimizing the passage of either cleansed air at high pressure or emissions past the butterfly 40. However, the gap between the flange 64 on the butterfly 40 and housing flange 82 permits fluid flow therebetween. Thus, pressurized air passing through the aperture 90 from the plenum 50 flows between the flange 64 on the butterfly 40 and the surface 80 on the valve housing flange 82 to preclude the passage of emissions into the annular space between the valve flanges 78 and 82 thereby precluding passage of emissions past the butterfly 40. Since the aforesaid air flow comprises cleansed air. It in effect substitutes cleansed pressurized air for contaminated air.

If desired, the manifold 62 can be connected to the intake of a second exhaust fan (not shown) thereby creating a partial vacuum in the plenum 50. Fluid flow in this case would be from the downstream side of the butterfly 40 past the butterfly flange 64 and housing flange 82, thence through the orifice 90 into the plenum 50. The plenum 50 is vented to manifold 62, thence back to the incinerator feed pipe 22.

While the preferred embodiment of the invention has been disclosed, it should be appreciated that the invention is susceptible of modification without departing from the scope of the following claims.

I claim:

1. A vented valve comprising
    a cylindrical valve housing;
    a circular valve butterfly;
    means mounting said butterfly for rotation about an axis extending diametrically of said valve housing;
    a pair of annular butterfly flanges on the periphery of said butterfly, said butterfly flanges extending oppositely on opposite sides of said mounting means in the direction of rotation of said butterfly and parallel to the axis of said valve housing when said butterfly is in the closed condition;
    a first pair of annular housing flanges on the inner periphery of said valve housing extending radially thereof to an inside diameter less than the outside diameter of said butterfly flanges so as to be engagable by said butterfly;
    a second pair of annular housing flanges on said valve housing radially aligned with the butterfly flanges on said butterfly and axially spaced from said first housing flanges, said second housing flanges extending radially to an inside diameter greater than the outside diameter of said butterfly so as to provide a clearance therebetween;
    an annular plenum extending about the periphery of said valve housing and having an aperture disposed between the first and second housing flanges on said housing so as to provide a fluid flow path between said butterfly and said plenum; and
    conduit means connected to said plenum in fluid flow relationship therewith.

2. A valve in accordance with claim 1 wherein the flanges on said butterfly are spaced radially from the second housing flanges by at least 0.05% of the valve diameter to provide for radial expansion and contraction of said valve housing.

* * * * *